Feb. 26, 1924.
W. M. BLACK
LAWN TRIMMER
Filed June 27, 1922
1,484,755
Fig. 1
Fig. 2
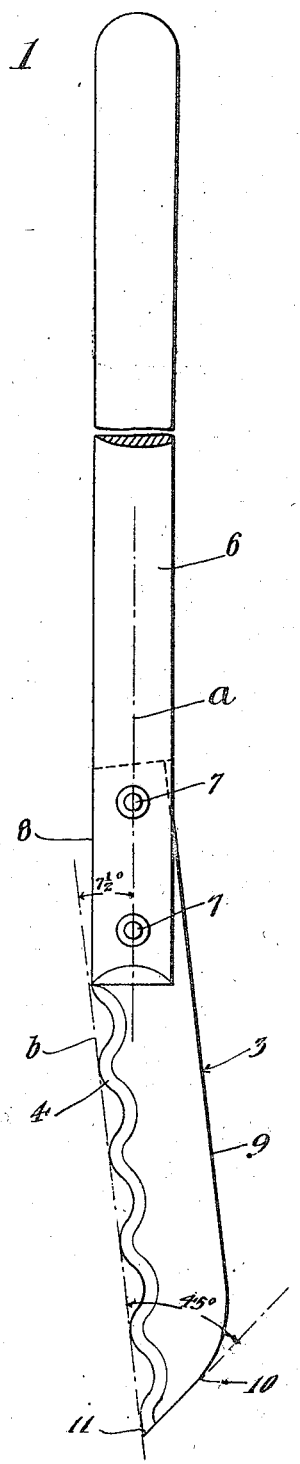
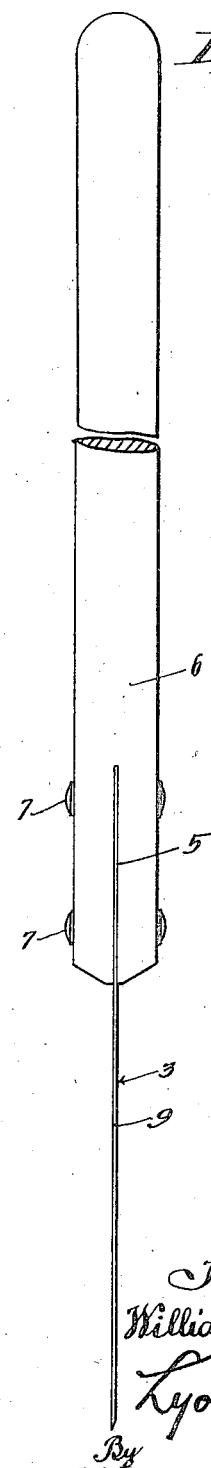
Inventor
William M. Black
Lyon & Lyon
By                    attys.

Patented Feb. 26, 1924.

1,484,755

UNITED STATES PATENT OFFICE.

WILLIAM M. BLACK, OF HANFORD, CALIFORNIA.

LAWN TRIMMER.

Application filed June 27, 1922. Serial No. 571,238.

*To all whom it may concern:*

Be it known that I, WILLIAM M. BLACK, a citizen of the United States, residing at Hanford, in the county of Kings and State of California, have invented a new and useful Lawn Trimmer, of which the following is a specification.

This invention relates to lawn trimmers of the type employing a serrated blade and a handle.

An object of this invention is to provide a simple device of this character that is efficient for the purpose for which it is designed.

The accompanying drawings illustrate the invention:

Figure 1 is a side view of a lawn trimmer embodying the invention, a portion of the handle being broken away.

Fig. 2 is an edge view from the right of Figure 1.

There is provided a blade 3 having a serrated cutting edge 4, the serrations being preferably more or less rounded. Preferably the cutting edge is ground on one side only, the ground side being shown in Figure 1. The shank of the blade 3 fits in a slot 5 extending longitudinally in one end of a handle 6 of any suitable construction. Rivets 7 pass through the handle and through the blade 3 so as to prevent the blade from movement in the slot.

The shank of the blade is beveled at 8 so as to reduce the width of the shank, thus enabling the blade to be set at an angle in the handle. The longitudinal axis of the handle is indicated at *a* and passes through the axes of the rivets 7. The blade 3 is positioned with its cutting edge at an angle of approximately seven and one half degrees from the axis *a*.

The back edge 9 of the blade is substantially parallel with the cutting edge throughout almost the entire length of the cutting edge, but near the tip end the back edge 9 approaches the cutting edge at a sharp angle, as indicated at 10, to form a point 11. The tip portion 10 is at an angle of approximately forty-five degrees to the plane of the cutting edge. The handle is of relatively great length, being approximately six times as long as the distance between the handle and the point of the blade. This enables the operator to stand erect while operating the trimmer.

To use the invention the operator grasps the handle as he would a hoe or rake and inserts the point of the blade along the margin of the sidewalk, curb or wherever else the turf is to be cut. He then reciprocates the handle to produce a sawing action of the blade upon the roots and stems of the grass and other turf being operated on. The blade produces a slot between the grass roots and sidewalk or curb so that when the trimmer is thereafter used in the same place it can be operated very easily.

As the blade is moved up and down, saw-fashion, it cuts off all the growth that laps over the sidewalk, curb or other bounding structure, and at the same time severs all roots in its path that would otherwise grow out under the pavement and tend to disrupt said pavement. The use of this tool does away with the necessity of maintaining unsightly ditches or trenches along the edge of sidewalks, curbs, etc., and the discomfort of crawling on the hands and knees to trim with hand shears.

I claim:

A lawn trimmer comprising a handle provided in one end with a longitudinal slot, a blade having a serrated cutting edge and having a shank beveled along one edge, said shank being inserted in the slot and the blade being aslant rearwardly with its cutting edge extending at an angle to the longitudinal axis of the handle, and rivets passing through the handle and shank substantially in the longitudinal axis of the handle, the back edge of the blade being substantially parallel with the cutting edge throughout all but the tip position of the blade, and the back edge of the blade near the tip thereof approaching the cutting edge at an angle of approximately 45° to the plane of the cutting edge.

Signed at Hanford, California, this 16th day of June, 1922.

WILLIAM M. BLACK.